(12) United States Patent
Larroque et al.

(10) Patent No.: US 11,713,139 B2
(45) Date of Patent: Aug. 1, 2023

(54) MOVABLE CARRIAGE SYSTEM AND METHOD FOR IMPLEMENTING A MOVABLE CARRIAGE SYSTEM

(71) Applicant: EXCENT FRANCE, Colomiers (FR)

(72) Inventors: Clémence Larroque, Auch (FR); Alexandre Bonneau, Blagnac (FR)

(73) Assignee: EXCENT FRANCE, Colomiers (FR)

( * ) Notice: Subject to any disclaimer, the term of this patent is extended or adjusted under 35 U.S.C. 154(b) by 0 days.

(21) Appl. No.: 17/681,679

(22) Filed: Feb. 25, 2022

(65) Prior Publication Data
US 2022/0388688 A1 Dec. 8, 2022

(30) Foreign Application Priority Data

Feb. 26, 2021 (FR) ...................................... 21 01924

(51) Int. Cl.
*B64F 5/50* (2017.01)
*B64F 5/10* (2017.01)
*F01D 25/28* (2006.01)

(52) U.S. Cl.
CPC .................. *B64F 5/50* (2017.01); *B64F 5/10* (2017.01); *F01D 25/285* (2013.01)

(58) Field of Classification Search
CPC ............. F05D 2230/68; F05D 2230/70; F05D 2230/80; F05D 2230/72; B62B 2207/00; F01D 25/285; B64F 5/10; B64F 5/50
See application file for complete search history.

(56) References Cited

U.S. PATENT DOCUMENTS

2007/0189884 A1* 8/2007 Masters .................... B64F 5/50
414/431

FOREIGN PATENT DOCUMENTS

WO WO-2017020882 A1 * 2/2017 ........... F01D 25/285

OTHER PUBLICATIONS

Cerovsky F, WO-2017020882-A1, Feb. 2017 (Year: 2017).*
Cerovsky F, WO-2017/020882A! Machine Translation (Year: 2017).*

* cited by examiner

*Primary Examiner* — Lee A Holly
(74) *Attorney, Agent, or Firm* — Ipsilon USA, LLP

(57) ABSTRACT

A movable carriage system for an aircraft element, such as an aeroplane engine, has a first movable module (10) and a second movable module (20). Each movable module has a frame (12, 22) equipped with at least three wheels, a lifting device adapted to be able to move said aircraft element at least in a vertical direction, and at least one link arm (16, 17) adapted to be able to secure together the frame of said first module and the frame of said second module and to allow data to be transferred between them. The movable modules are adapted to be able to be controlled in a mutually coordinated manner.

14 Claims, 8 Drawing Sheets

MOVABLE CARRIAGE SYSTEM AND METHOD FOR IMPLEMENTING A MOVABLE CARRIAGE SYSTEM

RELATED APPLICATION

This application claims the benefit of priority from French Patent Application No. 21 01924, filed on Feb. 26, 2021, the entirety of which is incorporated by reference.

TECHNICAL FIELD

The invention relates to a movable carriage system for an aircraft element, such as an aeroplane engine. The invention also relates to a method for implementing a movable carriage system for such an aircraft element.

PRIOR ART

Civil aviation has experienced significant growth in recent years and continues to enjoy favorable momentum. Increased availability of aeroplanes is a major issue for aircraft manufacturers.

All the stakeholders in the industry (aircraft manufacturers, airlines, engine manufacturers, aeronautic maintenance service providers, etc.) have an interest in reducing the operating costs and the durations for which the aeroplanes must remain on the ground.

Aeroplane engines are items of equipment that are very often assembled and disassembled, in particular for maintenance operations. These operations require suitable handling systems.

To this end, transport jigs are known for aeroplane engines that are capable of being used throughout all the life phases of the engine, in particular assembly, transporting, lifting, maintenance, storage or even installation on or removal from an aeroplane. In particular, transport jigs are known that comprise a cradle that can receive an engine and a rolling base receiving said cradle, in particular for the rolling and road and air transport phases. Thus, there are many separate transport jigs that are specific to each type of aeroplane engine, to the user, as well as to the operating phase of the engine. Furthermore, each transport jig can require various additional accessories for the handling thereof. This results in additional equipment costs, as well as additional costs associated with the surface area required to store these many accessories.

Furthermore, an efficient solution does not exist for the engines of wide-bodied and long-haul aeroplanes with a wide fuselage, for which the constraints related to the weight of the engines (several tons, even more than 10 tons) and the bulk of the engines and of the aeroplanes are high.

SUMMARY OF THE INVENTION

The invention aims to overcome all these disadvantages.

The invention aims to propose a movable carriage system adapted to be able to move an aircraft element that is large (several meters long and several meters wide and/or several meters in diameter) and of significant weight, particularly ranging up to 20 tons (20,000 kg), or more.

The invention also aims to propose such a movable carriage system that itself has reduced bulk.

The invention also aims to propose such a movable carriage system providing perfect operating safety.

The invention also aims to propose a method for implementing such a safe movable carriage system, which is easy to produce and enables significant time savings.

SUMMARY OF THE INVENTION

The invention relates to a movable carriage system for an aircraft element, such as an aeroplane engine, said system comprising:
- a first movable module and a second movable module that are adapted to be able to be controlled in a mutually coordinated manner, each movable module mainly extending along a longitudinal axis and comprising:
  - a frame provided with at least three wheels;
  - a lifting device adapted to be able to move said aircraft element at least in a vertical direction; and
  - at least one link arm adapted to be able to secure together the frame of said first module and the frame of said second module.

In particular the movable carriage system is characterized in that each lifting device comprises at least one fork extending in a transverse direction, orthogonal to said longitudinal axis.

The forks of each lifting device can load, transport, lift, and also precisely position an aircraft element in height. For example, the forks can load the aircraft element through a transport jig. A movable carriage system according to the invention thus allows handling, in particular movement on the ground and lifting, of such an aircraft element without requiring particular adaptation or accessories that are generally used to be adapted to each situation, and particularly to all the transport jigs and aircraft engines with various dimensions, while having reduced bulk, with each removable module also being able to be controlled and moved independently of each other or in a coordinated manner when they are secured together using at least one link arm allowing a reliable mechanical and physical communication link to be provided between said first movable module and said second movable module.

Thus, in some embodiments of the invention, the movable carriage system comprises at least one link arm comprising a communication cable adapted to allow data to be transferred between the first movable module and the second movable module.

In particular, such a physical communication link by virtue of said communication cable of said link arm avoids any risk of a temporary break in the communication link that could prove to be dangerous for the ground operators, as well as for the aircraft element being handled.

The longitudinal axis of each movable module is also generally the axis along which each movable module according to the invention has the largest overall dimension. The width of a movable module according to the invention is a dimension thereof along a horizontal axis, named transverse axis, orthogonal to said longitudinal axis. Similarly, a forward orientation and a rearward orientation can be defined along said longitudinal axis, with the system according to the invention having a main direction of travel, named forward direction, along said longitudinal axis, the system according to the invention nevertheless being adapted to be able to move in both directions along said longitudinal axis. Given said forward direction, one of the longitudinal ends of each movable module is called front end, with the other opposite longitudinal end being called rear end.

Throughout the document, the vertical direction is understood to mean any direction orthogonal to a main plane of movement of said system on the ground in the longitudinal and transverse directions. Accordingly, in some embodiments, the transverse direction of each fork may be a horizontal direction.

According to some embodiments, when the first movable module and the second movable module are secured together using said at least one link arm, the movable carriage system is adapted to receive said aircraft element, such as an aeroplane engine, between the first movable module and the second movable module. In other words, the aircraft element that is likely to be handled and moved (on the ground or by lifting) by a carriage system according to the invention is intended to be disposed between the first movable module and the second movable module. In particular, when an aircraft engine is involved, said engine can be disposed so that the longitudinal axis of said aircraft engine is oriented parallel or perpendicular to the longitudinal axis of each of the movable modules.

Each link arm can be permanently fixed by one of the longitudinal ends thereof to one from among said first movable module or said second movable module, with the other free longitudinal end of said link arm being solely fixed to the other one from among said first movable module or said second movable module when the first movable module and the second movable module are associated in order to cooperate with each other when handling or moving said aircraft element. It is also possible to prescribe having each link arm assembled to the first movable module and to the second movable module at the same time when said modules are associated in order to cooperate with each other, i.e. without each link arm being permanently fixed to the first movable module or to the second movable module.

According to some embodiments, each link arm extends in a transverse direction, orthogonal to said longitudinal direction of said movable module. This particularly corresponds at least to the configuration of each link arm when the first movable module and the second movable module cooperate with each other with a view to handling and/or moving an aircraft element. Furthermore, nothing precludes prescribing that each link arm can have a separate configuration, named folded configuration, with reduced bulk, in which configuration each link arm can be placed when the first movable module and the second movable module are not secured together. In such a folded configuration each link arm can be, for example, telescopic and/or pivotable so as to be able to extend in a direction parallel to the longitudinal direction of said movable module to which it is fixed.

According to some embodiments, each link arm can be in the form of a bar, a rod or even a profile. Each bar or rod can have a circular or polygonal transverse cross-section. In particular, according to some embodiments, such a bar is formed from at least one material selected from the group formed by composite materials, metal materials, polymer materials and ceramic materials. It can particularly be a hollow metal bar, a bar with a rectangular transverse cross-section (flat or profiled bar).

According to some embodiments, each link arm has an end fixed to at least one movable module. In particular, a system according to the invention comprises two link arms, with a first link arm being fixed to the frame of said first movable module and a second link arm being fixed to the frame of said second movable module.

The ends of each link arm can be assembled to said first movable module and to said second movable module using any type of non-zero link, and in particular using any type of link comprising at least three degrees of translation linkage. In this way, this allows forces to be transferred between each link arm and at least one from among said first movable module and said second movable module along the three translation axes. In particular, each link arm is linked to at least one from among said first movable module and said second movable module (via at least one fixing end) by a link selected from the group formed by complete links (without any degree of freedom, also called rigid fixings), pivot links (the axis of which is orthogonal to the direction along which the link arm extends) and ball joint links (links with a central point that can be equivalent to three pivot links with perpendicular axes). According to a particularly advantageous embodiment, each link arm is linked to at least one from among said first movable module and said second movable module by a pivot link.

According to some embodiments, each link arm exhibits stiffness and compression and/or tensile and/or shear resistance that is able to increase the stiffness of the movable carriage system according to the invention with respect to translation or rotation movements of the first movable module and of the second movable module in relation to each other. In particular, each link arm is adapted to exhibit tensile resistance and/or compression resistance at least between two points of the frame of each movable module to which it is fixed.

Said link arms allow the two movable modules to be secured together, and particularly allow a constant clearance to be maintained between them, in particular by preventing them from spacing apart under the weight of the aircraft element. They therefore allow a fixed relative position to be maintained in relation to each other.

In some embodiments, at least the first movable module may include a link cable configured to be connected to the second movable module, and means for managing the storage and the deployment of the link cable. The link cable allows the spacing between the two movable modules to be maintained while providing a larger space between the two movable modules. Thus, the movable carriage system has greater adaptability and allows for the loading of larger aircraft elements.

According to some embodiments, the frame of each movable module is equipped with at least two motorized wheels.

According to some embodiments, each wheel can be oriented up to 360° in relation to the longitudinal axis, in particular each wheel can be oriented at an angle ranging up to 270° in relation to the longitudinal axis (corresponding to the direction 0°-180°). In this way, each movable module is omnidirectional, allowing the movable carriage system according to the invention to be able to move in all directions.

Each movable module comprises an energy source. According to some embodiments, each movable module comprises at least one electric energy accumulator, for example an electric battery (rechargeable or non-rechargeable).

Each movable module can be controlled individually, i.e. independently of the other movable module, in particular when no aircraft element is loaded on said movable module, or in a coordinated manner with the other movable module, in particular when handling an aircraft element using the system according to the invention.

According to some embodiments, each lifting device comprises at least one lifting jack. Each lifting jack can be hydraulic or electric. In particular, each lifting device comprises two lifting jacks and vertical columns. Each lifting device can be, for example, a scissor lifting device activated using said lifting jacks. Any other type of lifting device can also be used.

According to some embodiments, each movable module may comprise a longitudinally extending rail, each fork being attached to a rail through a fixing device, each fork and fixing device being mounted in translation along the rail. Adjusting the spacing between the forks gives the movable carriage system great flexibility in loading any size of aircraft element.

According to some embodiments, each fork may include at least one bearing pad and a system for adjusting the spatial orientation of the bearing pad along at least one axis. The pads and the adjustment system allow for adjustment of the bearing face position of the bearing pad to provide better loading engagement of the aircraft element.

According to some embodiments, said system comprises a device for locking each fork. In particular, said system comprises a device for locking each fork of said first movable module with said second movable module and a device for locking each fork of said second movable module with said first movable module. It can involve forks that lock together (via the free ends thereof) or forks for which the free end locks with a locking element provided on the other movable module (separate from that to which said fork is fixed).

According to some embodiments, each lifting device is adapted to be able to move said aircraft element vertically and by an incline in relation to a lifting plane orthogonal to said vertical direction.

According to some embodiments, said system further comprises an additional device for adjusting the height of the forks, allowing additional play to be provided along the vertical axis, in particular during operations for installing and/or removing an aircraft element. In particular, each rail fixing device may include a stop rocker which is operated by means of a stop lever. The stop rocker provides some additional clearance for adjusting the position of the forks along the vertical axis, which is particularly useful during the installation and/or removal operations of the aircraft element.

According to some embodiments, each movable module comprises at least two jacks, named flexible jacks, with each flexible jack being associated with at least one ball bearing plate, so as to allow at least one translation movement of said aircraft element in a horizontal plane, substantially orthogonal to said vertical direction, in relation to each movable module. This allows, once each flexible jack is deployed, the load formed by the aircraft element (and a transport jig of said aircraft element, if applicable) to be released, giving the impression of floating as on an air cushion, and allowing a small number of operators to manually exert forces on said aircraft element (and on a transport jig, if applicable), in order to align a device for fixing said aircraft element to said aircraft (for example, aligning the holes in the mounting plates of an aircraft engine with the pins of an aircraft pylon). Each flexible jack can be hydraulic or electric. Each flexible jack also allows the attitude and the incline of each movable module to be adjusted, and thus allows the aircraft element to be moved to be handled as precisely as possible.

This also can be carried out using another lift system instead of each ball bearing plate, for example an air cushion (pressurized air layer) or even using a hydrostatic bearing or a hydrodynamic bearing.

According to some particularly advantageous embodiments, each lifting device comprises three flexible jacks, with two jacks being disposed at each of the longitudinal ends of said movable module and the third jack being disposed in the vicinity of a central portion of the frame of said movable module.

A movable carriage system according to the invention is adapted to be able to move any type of bulky element, in particular an aircraft element, such as an aeroplane engine, landing gear or even a fuselage section.

A movable carriage system according to the invention is adapted to be able to move said aircraft element using a transport jig receiving said aircraft element, with a movable carriage system according to the invention then being adapted to move the assembly formed by a transport jig and an aircraft element, for example an aeroplane engine. A movable carriage system according to the invention is adapted to be able to cooperate with any type of transport jig for an aeroplane engine.

The invention also relates to a method for implementing such a movable carriage system. In particular, the invention relates to a method for implementing a movable carriage system for an aircraft element, said movable carriage system comprising a first movable module and a second movable module, each movable module mainly extending along a longitudinal axis and comprising a frame equipped with at least three wheels, in which method:

the frame of said first module and the frame of said second movable module are secured together using at least one link arm; then said first movable module and said second movable module are controlled in a mutually coordinated manner;

said aircraft element is moved at least in a vertical direction using a device for lifting said movable module.

According to the invention, prior to the step of securing the frame of the first module and the frame of the second movable module using said at least one link arm:

said first movable module is controlled so as to insert at least one fork of said first movable module into sleeves of a receiving transport jig adapted to be able to receive said aircraft element;

said second movable module is controlled so as to insert at least one fork of said second movable module into said sleeves of said receiving transport jig.

According to some embodiments, after having moved said aircraft element at least in a vertical direction using said lifting device, each flexible jack is deployed so as to allow at least one translation movement of said aircraft element in a horizontal plane, substantially orthogonal to said vertical direction, in relation to each movable module.

However, nothing precludes also using the lifting device after the deployment of the flexible jacks.

According to some embodiments, after having inserted the forks of each of said first and second movable modules into said sleeves of said transport jig for said aircraft element, each fork of said first movable module is locked with said second movable module and each fork of said second movable module is locked with said first movable module.

The invention also relates to a system and an implementation method which are characterized, in combination or individually, by all or some of the features mentioned above or hereafter. Irrespective of the formal presentation that is provided, unless explicitly stated otherwise, the various features mentioned above or hereafter do not have to be considered to be closely or inextricably linked, the invention can relate to only one of these structural or functional features, or only part of these structural or functional features, or only part of one of these structural or functional features, or even any aggregation, combination or juxtaposition of all or part of these structural or functional features.

BRIEF DESCRIPTION OF THE FIGURES

Further aims, features and advantages of the invention will become apparent upon reading the following detailed description of some possible embodiments, which are provided by way of non-limiting example and which refer to the accompanying figures, in which.

DETAILED DESCRIPTION

Figure 1:
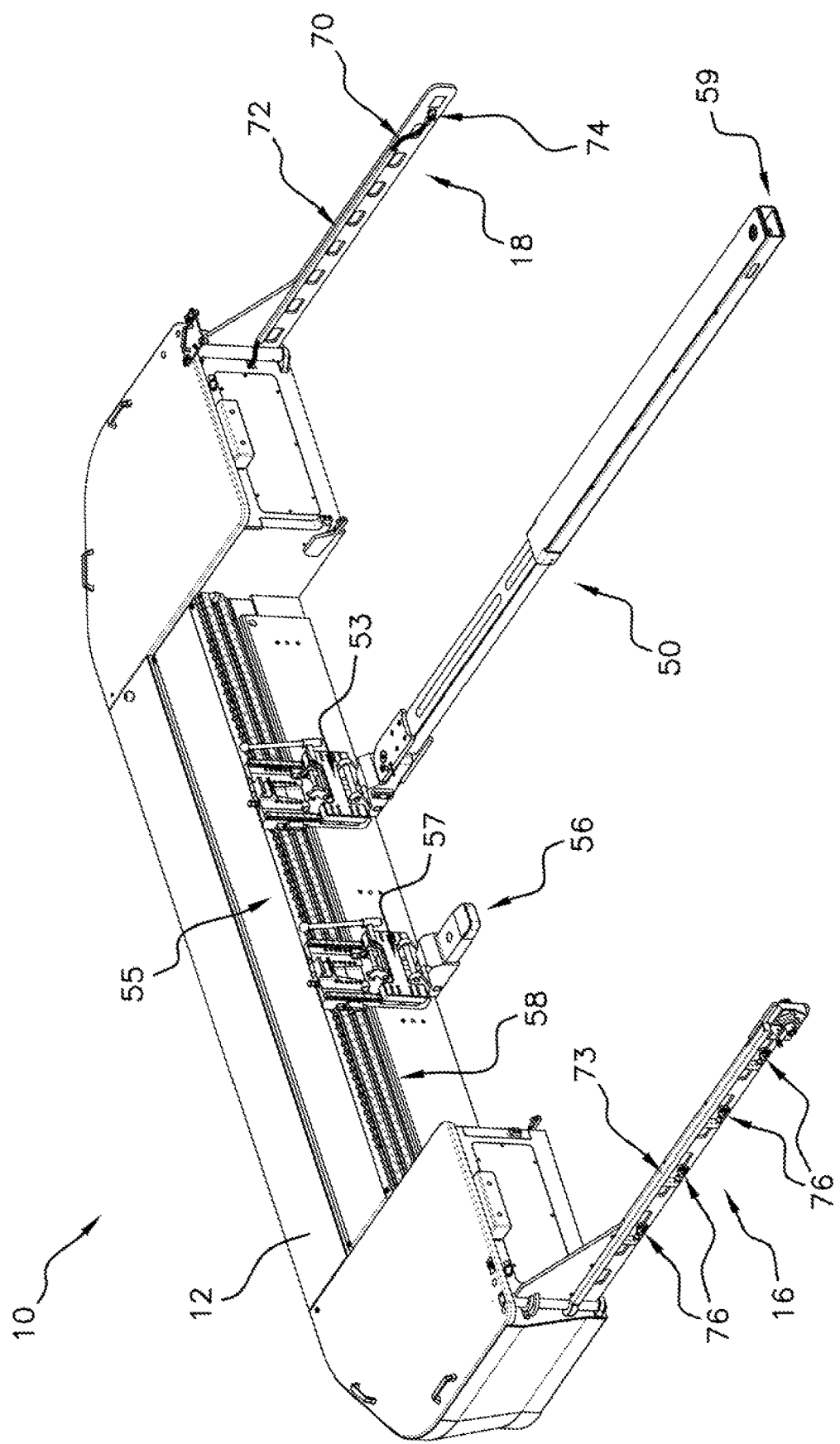
FIG. 1 shows a perspective view of a movable module of a system according to the invention.

In the figures illustrating the invention, which are provided solely by way of non-limiting example, the proportions are not necessarily to scale, which is only for the sake of the clarity of the disclosure.

The movable carriage system 1 shown in FIGS. 1 to 8 comprises a first movable module 10 and a second movable module 20. Each movable module 10, 20 mainly extends along a longitudinal axis and comprises a frame 12, 22 equipped with wheels, as well as a lifting device 55 adapted to be able to move an aircraft element, such as an aeroplane engine, at least in a vertical direction.

The first movable module 10 and the second movable module 20 are adapted to be able to be controlled in a mutually coordinated manner.

Each movable module 10, 20 can be controlled by an operator via a wireless remote control. The first movable module and the second movable module can be controlled independently of each other or simultaneously, in particular when handling an aircraft element using the system according to the invention. In other words, each movable module 10, 20 can be controlled individually, independently of the other movable module (in particular when no aircraft element is loaded onto said movable module, but, for example, for moving the movable module towards the aircraft element to be handled or towards a storage area after a handling operation).

Each movable module 10, 20 is energy independent, each movable module can, for example, comprise at least one electric battery.

The movable carriage system 1 comprises at least one link arm 16, 17 adapted to be able to secure together the frame of the first module and the frame of the second module. In the embodiment shown, each movable module comprises a link arm, with the first movable module 10 comprising a first link arm 16 and the second movable module 20 comprising a second link arm 17.

Figure 3:
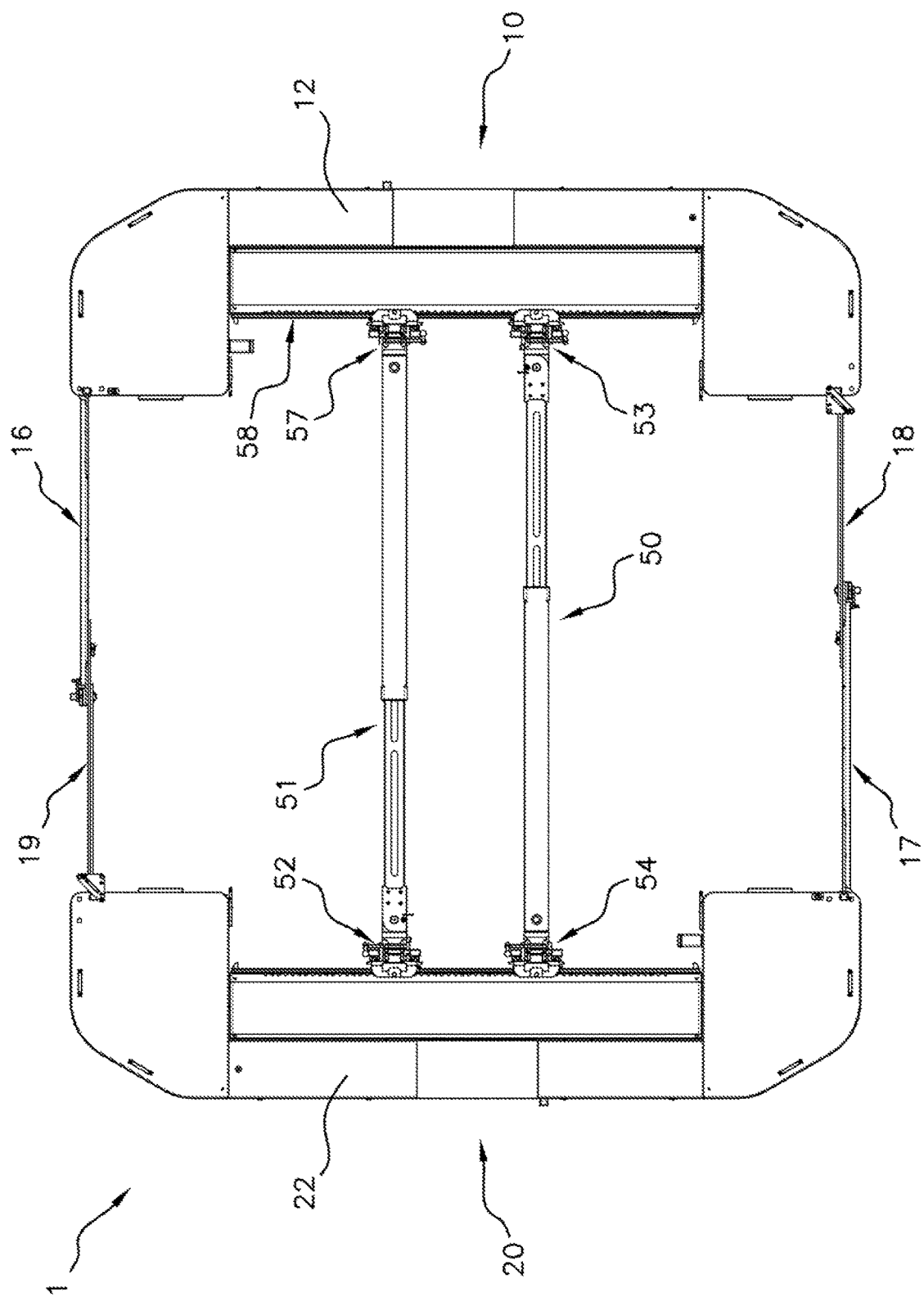
FIG. 3 shows a top view of a system according to the invention.
Figure 4:
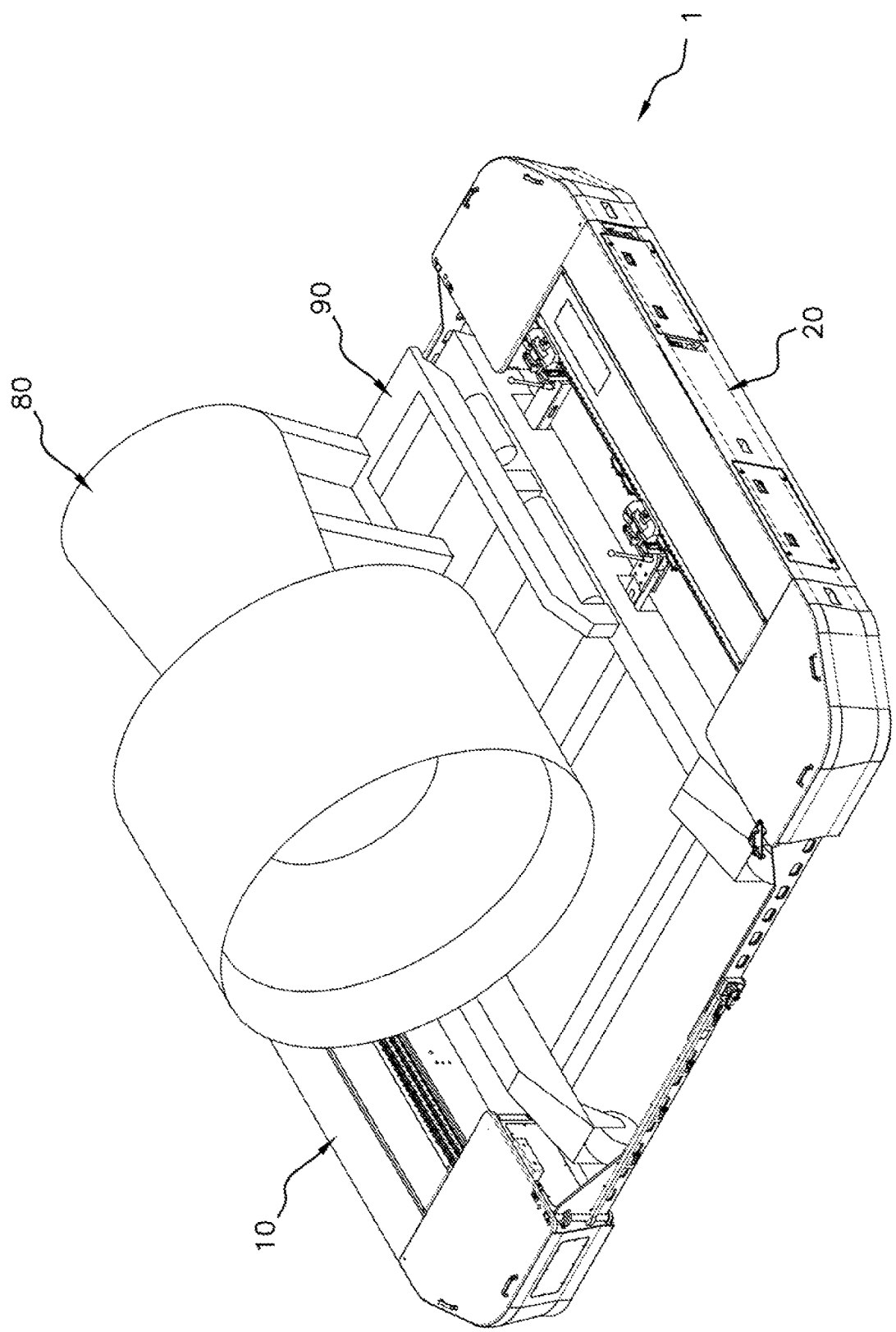
FIG. 4 shows a perspective view of a system according to the invention with a transport jig and an aircraft engine.

The link arms 16, 17 allow the two movable modules 10, 20 to be secured together while maintaining a constant clearance between the two movable modules 10, 20, and in particular preventing them from moving apart while preventing them from meeting. They also allow a fixed relative position to be maintained in relation to each other, as can be seen in FIG. 3. An engine 80 and a transport jig 90, on which the engine (or another aircraft element) rests, can be disposed between the first movable module 10 and the second movable module 20, as shown in FIG. 4. The aircraft element to be handled, an aircraft engine 80 in the embodiment shown, is intended to be disposed between the first movable module 10 and the second movable module 20 of the movable carriage system. In the embodiment shown, the aircraft engine is disposed so that the longitudinal axis of the aircraft engine is oriented parallel to the longitudinal axis of each of the movable modules 10, 20. Nothing precludes prescribing that the orientation of the aircraft engine loaded onto the system is different to that shown, and for example is perpendicular to the longitudinal axis of each of the movable modules 10, 20.

In the embodiment shown, each link arm 16, 17, 18, 19 extends in a substantially transverse direction, orthogonal to said longitudinal direction of each movable module 10, 20, with each link arm 16, 17, 18, 19 being linked to the frame of the first movable module 10 or to the frame of the second module 20 by a pivot link allowing rotation about a vertical axis, orthogonal to the direction in which said link arm extends. The first movable module 10 comprises two link arms 16, 18. The second movable module 20 comprises two link arms 17, 19. The link arm 16 of the first movable module 10 is fixed to the link arm 19 of the second module 20 by a mechanical link, allowing the total length formed by the two link arms to be adjusted. Similarly, the link arm 17 of the second movable module 20 is fixed to the link arm 18 of the first movable module 10 by a mechanical link, allowing the total length formed by the two link arms to be adjusted. The link arms are fixed and adjusted so that an identical distance separates the first movable module 10 and the second movable module 20. The link connecting the link arms together, after adjusting the total length, is a complete link, with the two link arms assembled in pairs each acting like a single bar or rod.

When the first movable module and the second movable module are secured together via said link arm and move simultaneously, one of the two modules preferably operates as a "master".

At least one link arm 18, 19 comprises a communication cable 70 adapted to allow data to be communicated and transferred between the first movable module 10 and the second movable module 20. Each communication cable 70 can be disposed inside the link arm (in the case whereby the link arm is formed by a hollow bar, for example) or can be added thereto, for example inside a tube 72, which is fixed along the link arm 18 (FIG. 1). In FIG. 1, the distal end of the communication cable 72 of the link arm 18 is connected to a storage connector 74. The link arm 16 also comprises a tube 73, inside which a communication cable (not shown) is previously disposed. The link arm 16 also has a plurality of connectors 76 connected to the communication cable disposed inside the tube 73. When the first movable module 10 and the second movable module 20 are secured together, a communication cable of the link arm 19 of the second movable module 20 can be connected to the connector 76, the end of which will be the closest, as a function of the desired adjustment of the distance (clearance) between the two movable modules 10 and 20.

Figure 2:
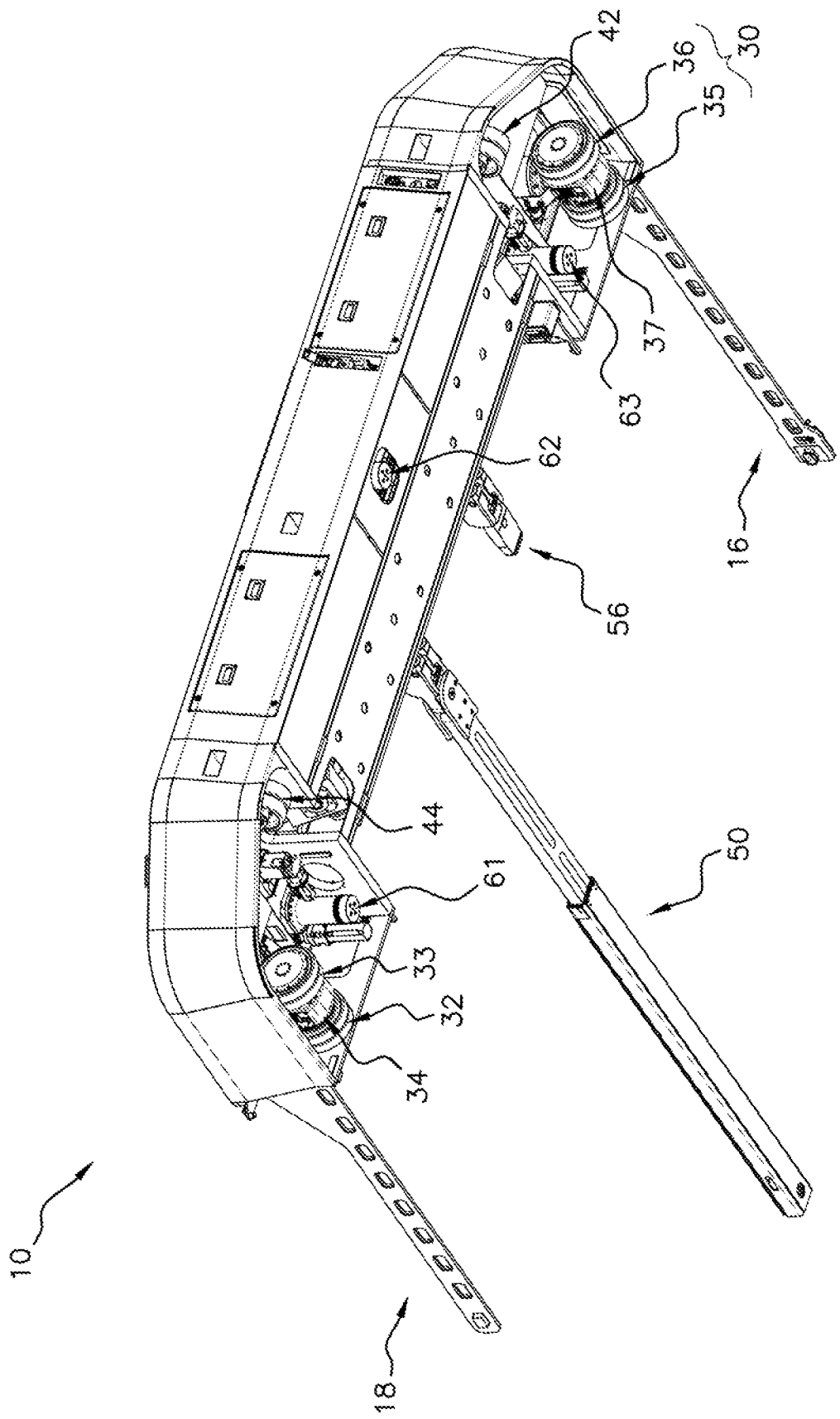
FIG. 2 shows a perspective bottom view of a movable module of a system according to the invention.

In the embodiment of a movable carriage system shown in FIGS. 1 to 8, as can be seen in FIG. 2 below, each wheel unit 30 comprises two motorized wheels 35, 36, 33, 34. The wheels are mounted on a shaft 34, 37 so as to allow uniform mutual distribution of the loads. The coordinated and synchronized rotation of the wheels 35, 36, 33, 34 in the opposite direction allows the wheel unit 30 to autorotate. In the embodiment of a movable carriage system shown in FIGS. 1 to 8, each movable module 10, 20 also comprises two idle wheels 42, 44 (FIG. 2).

Thus, each movable module is adapted to be able to be moved in all directions. Similarly, the movable carriage system comprising the first movable module and the second movable module secured together is adapted to be able to be moved in all directions. In this way, the system and each module can be axially moved (longitudinally or laterally in a transverse direction) forward or rearward, but also by completing an autorotation about a predetermined axis of rotation.

The system can comprise safety encoders allowing the relative position of each movable module to be controlled (in particular their clearance and the angle that they form in relation to each other) and thus allowing them to be controlled together.

Each lifting device is adapted to be able to move an aircraft element vertically and by an incline in relation to a lifting plane orthogonal to said vertical direction (pitch and/or roll movement independently or in combination with a movement in a vertical direction) by combining the coordinated movement of the lifting actuators. Each lifting device comprises at least one lifting jack (hydraulic or electric). In the embodiment of a movable carriage system shown in FIGS. 1 to 8, this is a scissor lifting device activated using two lifting jacks. The scissor lifting device can be seen in FIG. 11.

Each lifting device 55 of each movable module 10, 20 comprises at least one fork 50, 51 extending in a transverse direction. In the movable carriage system shown in FIGS. 1 to 8, each movable module 10, 20 comprises a fork 50, 51 and a device for locking the fork of the other movable module. In the embodiment of a movable carriage system shown in FIGS. 1 to 8, the first movable module 10 comprises a fork 50 fixed to a rail 58 via a first fixing device 53, as well as a second fixing device 57 with a "male" locking receiving end 56 adapted to be able to receive the end of a fork 51 of the second movable module 20. The second movable module 20 comprises a fork 51 fixed to a rail via a first fixing device 52, as well as a second fixing device 54 with a "male" locking receiving end adapted to receive the "female" end 59 of the fork 50 of the first movable module 10. As shown in FIG. 1, the rail 58 extends longitudinally across an inner face of a movable module frame 12. Each fork and each fixing device can translationally slide along said rail 58 of the first movable module or of an identical rail (not shown) of the second movable module. Locking also alternatively can be implemented between the respective ends of four forks (in pairs).

Thus, when the first movable module 10 and the second movable module 20 are assembled together using link arms 16, 17, 18, 19 (i.e. in particular in a configuration for moving or handling an aircraft element), the link arms and the forks extend in directions that are substantially parallel to each other.

Figure 11:
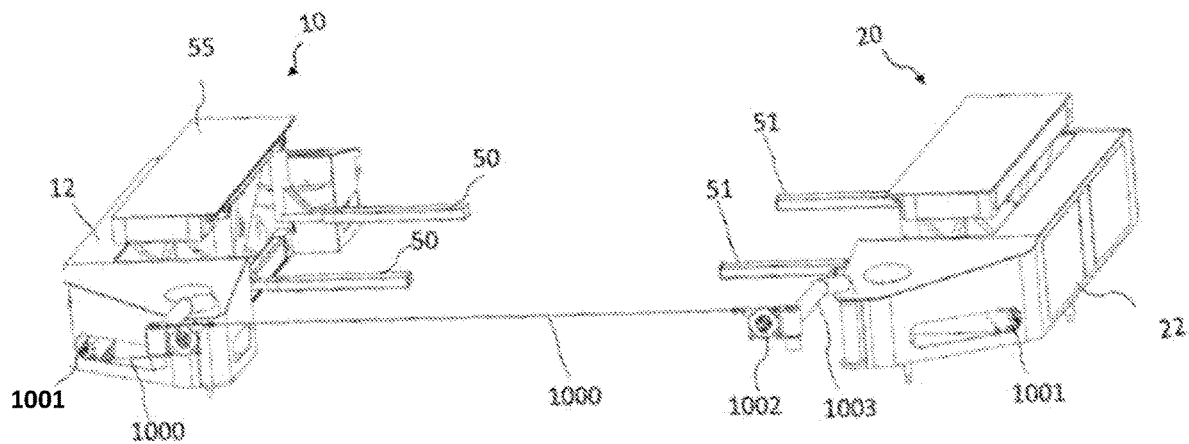
FIG. 11 represents a front view of a movable carriage system according to one embodiment of the invention.

In the example shown in FIG. 11, the link arm that is disposed in front of or behind the movable modules 10, 20 is replaced by at least one link cable 1000. In this embodiment, at least one movable module 10, 20 includes at least one link cable 1000 that is disposed in front of the movable carriage system 1. It should be noted that for reasons of clarity the link arm 16, 17 arranged at the rear of each movable module 10, 20 is not shown.

In the example of FIG. 11, each movable module 10, 20 includes a link cable 1000 configured to be connected to the other movable module 10, 20. In addition, each movable module 10, 20 that includes a link cable 1000 may include means for managing the storage and the deployment of the link cable 1000. In particular, each movable module 10, 20 may include reel 1001. The reel 1001 has locking means for maintaining a constant spacing between both movable modules 10, 20. In this example, the reel 1001 is housed in the frame 12, 22 of each movable module 10, 20. Additionally, the frame 12, 22 has an opening that allows the link cable 1000 to pass into the housing of the reel 1001.

According to the invention, each movable module 10, 20 may include a pulley 1002 facilitating the winding and the unwinding of the link cable 1000. In the example shown in FIG. 11, the pulley 1002 is offset from the frame 12, 22 of each movable module 10, 20. Thus, more space is generated between both movable modules 10, 20 for loading larger aircraft components.

In particular, each movable module 10, 20 may include an offset arm 1003 that carries the pulley 1002 at its free end. In this example, the offset arm 1003 is coupled to the frame using a pivot connection. Thus, the offset arm 1003 may be folded to improve the compactness of the movable carriage system 1 or deployed when loading an aircraft element to accommodate the dimensions of said aircraft element.

The pulley 1002 may also be rotatably mounted relative to the offset arm 1003. This provides adjustment of the spacing of the two movable modules 10, 20 relative to the aircraft element to be loaded. Each module 10, 20 includes a locking means for a link cable 1000 whose reel 1001 is located in the other movable module 10, 20. Here, the locking means is arranged on the pulley 1002. The locking means can be formed by a broaching.

In practice, the link cable 1000 housed in a first movable module is attached to the second movable module. If each movable module 10, 20 includes a link cable 1000, the two link cables 1000 are attached between the two movable modules.

The distance between the two movable modules 10, 20 is adjusted by driving one or both of the movable modules. The distance is adjusted according to the dimensions of the aircraft element and/or it transport jig. Then, the locking means of each reel 1001 is engaged in order to keep the distance between the two modules 10, 20 constant.

It should be noted that the link arms at the rear of each module 10, 20 are also coupled together. The adjustment of the spacing between the two movable modules is performed while the forks 50, 51 are inserted into the forks 900 of the transport frame 90.

The movable carriage system according to the embodiment shown in FIGS. 1 to 8 thus can adapt to all sizes of engines and transport jigs as a function of the clearance between the first movable module and the second movable module, of the clearance of the forks (parallel to each other), of the position of the forks on each movable module and of the height of the forks. These adjustments also allow the position of the center of gravity of the load represented by the aircraft element to be managed.

Each fork can be at least partly retractable, so as to be able to adjust the length. Each fork can be telescopically deployed and folded, for example.

Figure 5:
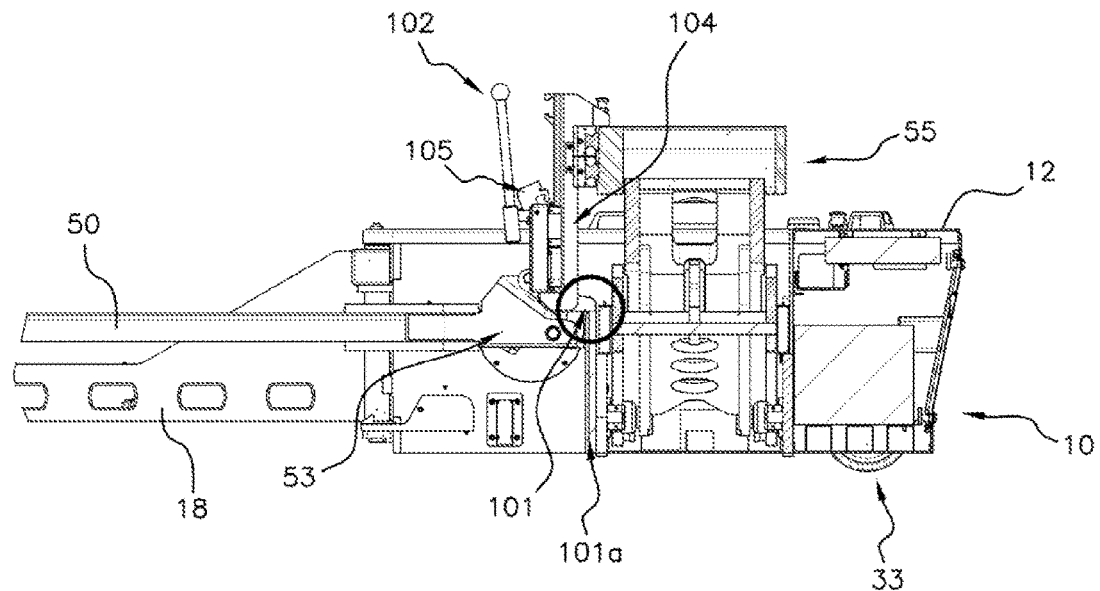
FIG. 5 shows a transverse section view of a detail of a system according to the invention.
Figure 6:
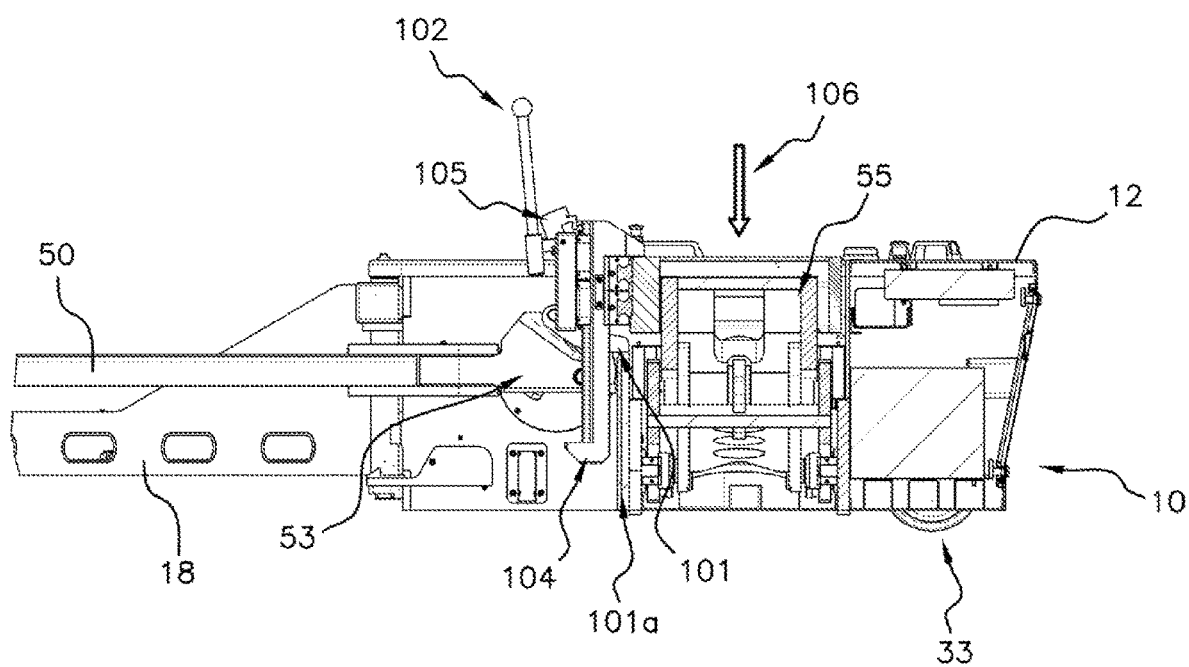
FIG. 6 shows a transverse section view of a detail of a system according to the invention.
Figure 7:
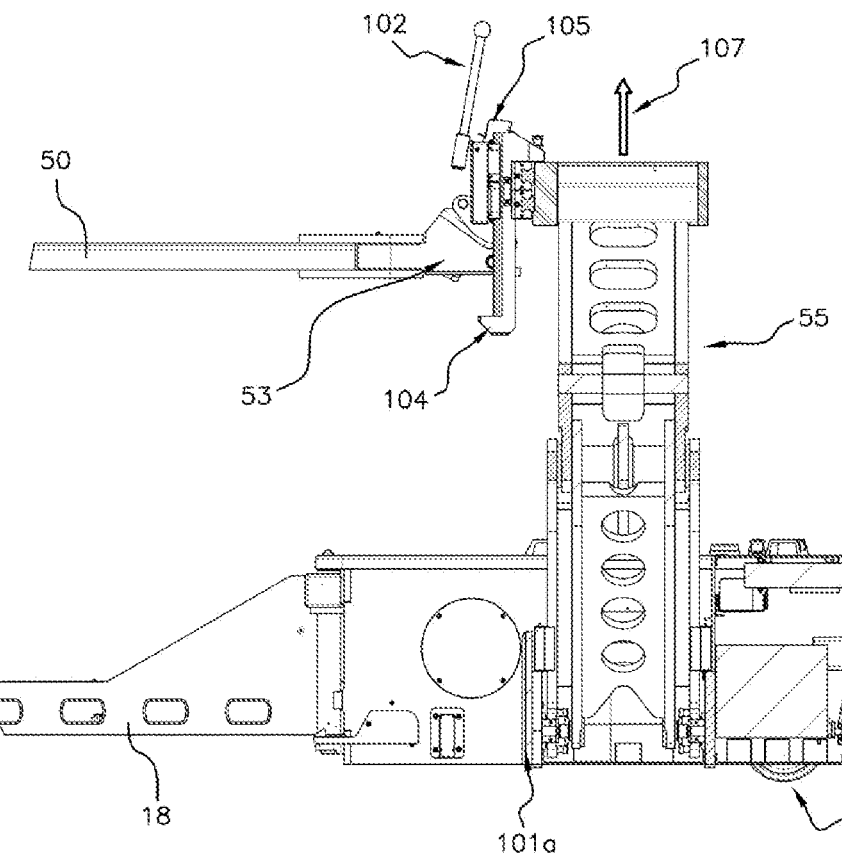
FIG. 7 shows a transverse section view of a detail of a system according to the invention, the forks of which are raised in a high position.

Each lifting device of the movable carriage system can also allow a second level of adjustment of the position of the forks in the vertical direction. In FIG. 1, each fork is in a position corresponding to the lowest position of the forks and to the normal position for taking a load using the forks. In this position, the distance between the upper face of each fork and an upper face of the lifting device is at its maximum. This position has the advantage of allowing a load to be taken using forks as close to the ground as possible when this is necessary. In the embodiment shown, as can be seen in FIGS. 5, 6 and 7, each device 53, 57 for fixing to the rail 58 also comprises a stop rocker 101 that can be activated using a stop lever 102. From a position as shown in FIG. 1, the lifting device is activated so as to lift the forks until a predetermined position is reached, shown in FIG. 5, in which position the stop lever 102 has been moved in order to modify the position of the stop rocker 101, an end of which comes into abutment on a part 101*a*, called fork cam, so as to allow the fixing device 53 to vertically move along a slide 104 until a low stop position is reached, as shown in FIG. 6, which position is reached after the lifting device is lowered, as shown by the arrow 106 in FIG. 6. In the position shown in FIG. 6, a locking lever 105 can be toggled (see FIG. 7 after this locking lever 105 has been toggled) and can allow the forks to be lifted upwards in this position, as shown by the arrow 107 in FIG. 7. This allows a certain amount of additional play to be provided along the vertical axis that is particularly useful and valuable during the operations of installing and/or removing the aircraft element.

Figure 9:
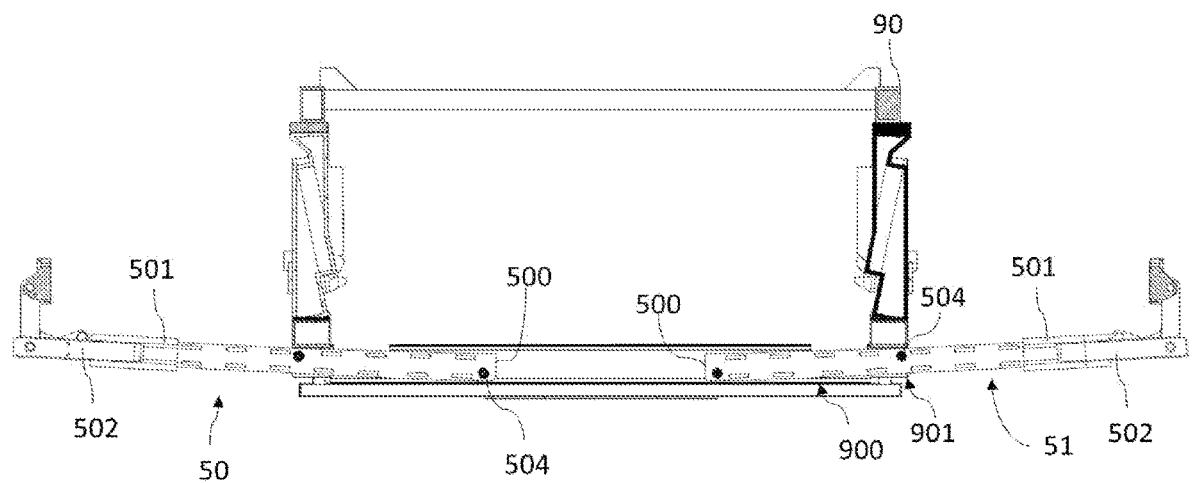
FIG. 9 represents a cross-sectional view of a transport jig in which a fork of each movable module is engaged in accordance with one embodiment of the invention.
Figure 10:
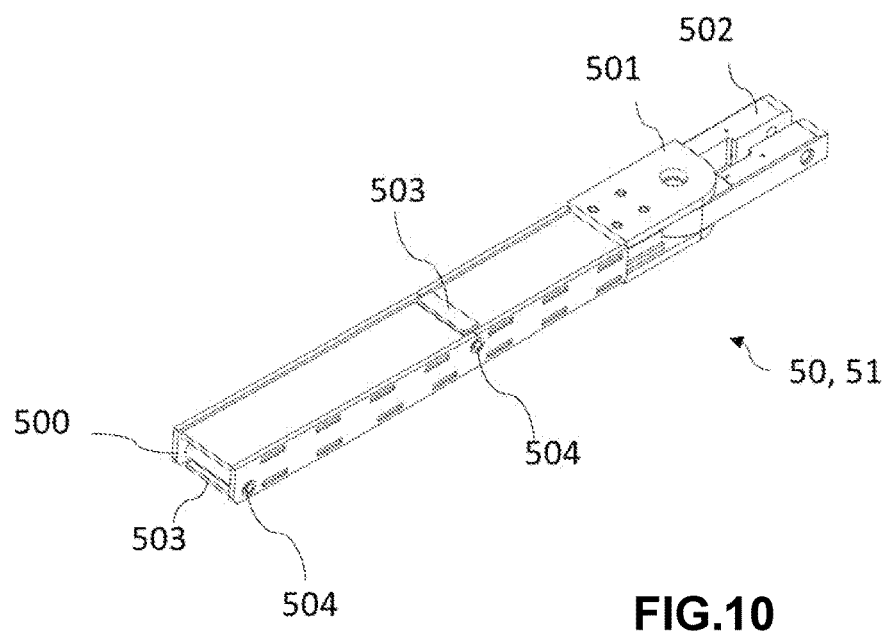
FIG. 10 represents a perspective view of a fork of the embodiment shown in FIG. 9.

As illustrated in FIGS. 9 and 10, each fork 50, 51 may extend longitudinally to a free end 500. In particular, each fork 50, 51 extends between a yoke-shaped member 501 and its free end 500. The forks 50, 51 may be constructed by mechanically welded assembly with mortise and tenon joints oriented to avoid working welds. In this example, each fork 50, 51 is pivotally mounted to the fixing device 53, 57. This allows the forks 50, 51 to be extended and collapsed parallel to the frame 12, 22 of the movable module 10, 20. The forks 50, 51 are extended for loading an aircraft element 80 and collapsed for storage and movement of the movable carriage system 1.

The yoke-shaped member 501 couples the fork 50, 51 to the fixing device 53, 57. Each movable module 10, 20 includes a coupling member 502 to which the yoke-shaped member 501 is pivotally mounted. The coupling part 502 is mounted on the fixing device 53, 57 of each movable module 10, 20. The articulation formed by the yoke-shaped member 501 and the coupling part 502 allows for the folding and unfolding of the forks 50, 51.

As illustrated in FIG. 9, each fork 50, 51 is configured to be cantilevered, for example, into a sleeve 900 of the transport frame 90. Indeed, once the fork 50, 51 is inserted into the sleeve 900, the free end 500 rests on a bottom wall of the sleeve 900. At the same time, at the entrance 901 of the sleeve 900, the body of the fork 50, 51 rests on an upper wall of the sleeve 900. In this embodiment, the movable carriage system comprises four identical forks 50, 51. Furthermore, the forks 50, 51 of two movable modules 10, 20 are not abutted together, in particular, each fork 50, 51 arcs boute between the two fulcrums between that the fork 50, 51 takes with the sleeve 900 into which said fork 50, 51 is introduced.

In the example shown in FIGS. 9 and 10, each fork 50, 51 includes at least one bearing pad 503. The bearing pad 503 provides a better grip when loading the aircraft element. In addition, each bearing pad 503 may include a system for adjusting the spatial orientation of the bearing pad 503 along at least one axis. The at least one-axis orientable bearing pad 503 improves the support of the aircraft element, for example, through a sleeve 900 of the transport jig 90. In this way, it is possible to orient the bearing pad 503 according to the bearing surface of the fork 50, 51 and prevent bearing on an unsuitable surface such as an edge. For example, the bearing pad 503 may be pivotally mounted on a pin 504 with limited travel. Here, the axis 504 is perpendicular to the longitudinal direction of the forks 50, 51.

In the example of FIGS. 9 and 10, each fork 50, 51 includes two bearing pads 503. A first bearing pad 503 is disposed at the free end of the fork 500. In particular, the first bearing pad 503 is disposed on the underside of the fork 50, 51. A second bearing pad 503 is disposed at a specific distance from the first bearing pad 503. In particular, the second bearing pad 503 may be disposed at a distance between 500 mm and 1000 mm from the first bearing pad 503. Furthermore, the second bearing pad 503 is provided on the upper side of the fork 50, 51, so that the first bearing pad 503 is supported on the lower wall of the sleeve 900 while the second bearing pad 503 is supported on the upper wall of the sleeve 900 at the entrance 901 thereof.

The forks 50, 51 of each movable module 10, 20 of FIGS. 9 and 10 are coupled to the fixing device 53, 57 in the same manner as the forks 50, 51 of FIGS. 1 to 8.

Advantageously, coupling the embodiment of FIGS. 9 and 10 and the embodiment of FIG. 11 allows for the generation of more substantial available space between the two movable modules 10, 20 in order to accommodate larger aircraft elements or transport jigs 90. Nevertheless, the embodiments of FIGS. 9, 10 and 11 are also compatible with the embodiments of FIGS. 1 to 8.

Each movable module 10, 20 comprises three flexible jacks 61, 62, 63. Two flexible jacks 61, 63 are disposed at each of the longitudinal ends of the frame of the first movable module 10 and the third jack 62 is disposed in the vicinity of a central portion of the frame 12 of the first movable module 10. Each flexible jack 61, 62, 63 can be hydraulic or electric. Each flexible jack can be associated with a ball bearing plate so as to allow, for example, travel in a substantially horizontal plane of plus or minus approximately 50 mm. This allows, once each flexible jack is deployed, the load formed by the aircraft element and the transport jig of the aircraft engine to be released, as well as allowing a smaller number of operators to be able to exert manual forces on the aircraft engine and the transport jig in order to align a device for fixing the aircraft engine to the fixings of an aircraft pylon. This also can be carried out using other lift systems instead of the ball bearing plates, such as an air cushion (pressurized air layer) or even using hydrostatic or hydrodynamic bearings. Each flexible jack also allows the attitude and the incline of each movable module to be adjusted.

Figure 8:
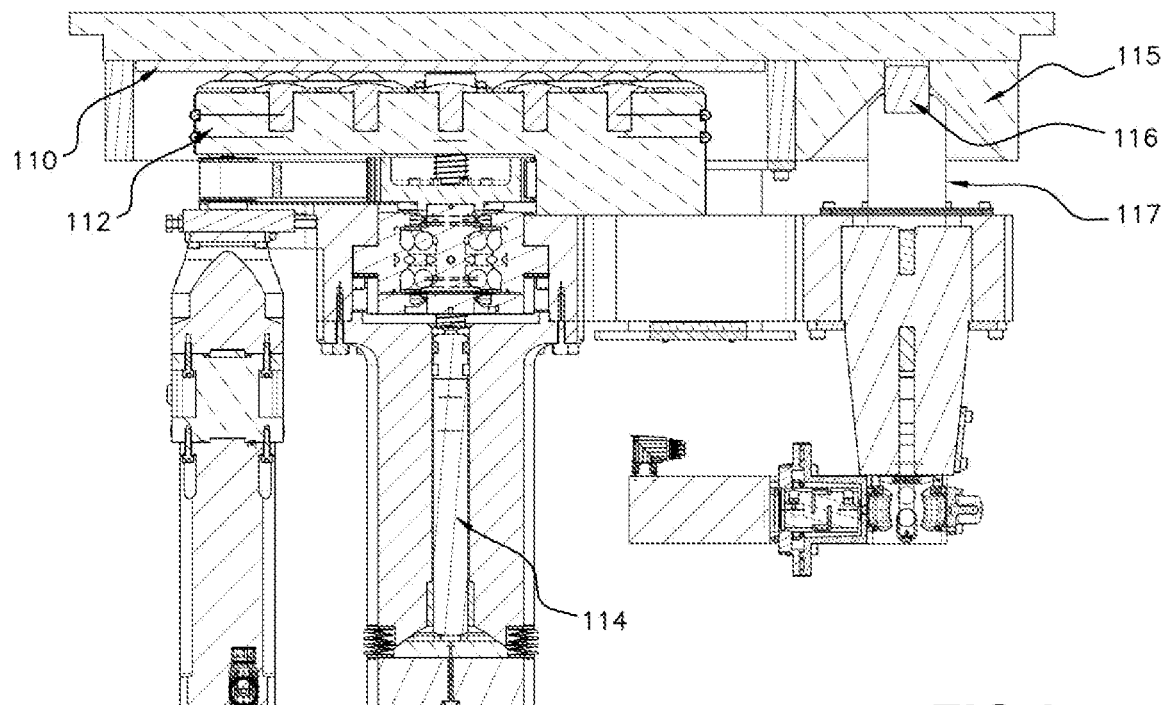
FIG. 8 shows a section view of a detail of a system according to the invention.

To this end, in the embodiment shown in FIGS. 1 to 8, and as can be seen in FIG. 8 in particular, the movable carriage system comprises a runner plate 110 placed on and in contact with the balls of a ball bearing plate 112 disposed opposite each lifting jack 114. A centering jack 117 is associated with this device and also comprises a centering block 116 adapted to be able to move in a centering cone 115. The locking axis allows the authorized range of movement of the ball bearing plate 112 on the runner plate 110 to be completely blocked or measured. This axis is controlled by an angle transmission geared motor. When the centering jack 117 is in the high position (as shown in FIG. 8), the centering cone 115 conforms to the shape of the centering block 116, thus blocking any relative movement between the ball bearing plate 112 and the runner plate 110. By progressively lowering the position of the centering jack 117, the centering block 116 descends into the centering cone 115 and the authorized range of motion in the plane increases.

The system can also comprise force sensors ensuring that the movable carriage system is not overloaded and/or ensuring, for example, that the application forces between the engine and the aircraft are controlled.

The movable carriage system 1 according to the embodiment shown in FIGS. 1 to 8 is less bulky, allowing it to be able to be transported by a lorry, a boat or even by an aeroplane. In order to facilitate their movement and their loading, each movable module can have at least two lifting rings, in particular three lifting rings distributed at the longitudinal ends and at the center, in order to be able to easily move it using an overhead crane. It is also possible to move each movable module 10, 20 with a forklift truck.

The movable carriage system according to the embodiment shown in FIGS. 1 to 8 has, for example, dimensions such that it is of the order of 6.40 meters long, of the order of 3.55 meters wide and of the order of 0.80 meters high when the first movable module and the second movable module are placed side-by-side (without a link arm between them and without their forks deployed) lengthwise.

In a method implementing a movable carriage system for an aircraft element:
said first movable module is controlled so as to insert the forks of said first movable module into the sleeves of a transport jig 90 adapted to be able to receive said aircraft element; then
said second movable module is controlled so as to insert the forks of said second movable module into said sleeves of said transport jig 90; then
the frame of said first module and the frame of said second movable module are secured together using at least one link arm; then
said first movable module and said second movable module are controlled in a mutually coordinated manner so as to allow the system to move on the ground;
said aircraft element is moved at least in a vertical direction using a device for lifting said movable module;
flexible jacks are deployed so as to allow at least one translation movement of said aircraft element in a horizontal plane, substantially orthogonal to said vertical direction, in relation to each movable module.

The lifting device also can be used after the deployment of the flexible jacks.

When they are deployed, the lower end of each of the flexible jacks 61, 62, 63 comes into contact with the ground.

Furthermore, the motorized wheels 35, 36, 33, 24 can be blocked, in particular prior to the deployment of the flexible jacks 61, 62, 63.

In particular, after having inserted the forks of each of said first and second movable modules into the sleeves of the transport jig, each fork 50 of the first movable module is locked with the second movable module and each fork 51 of the second movable module is locked with the first movable module. The forks particularly can be locked automatically, for example via a spring system, by virtue of which the forks are automatically locked as soon as a weight (i.e. that of an aircraft element and a possible transport jig) is supported by the forks, so as not to require manual intervention of an operator or electrical control.

The invention can be the subject of numerous variants and applications other than those described above. In particular, it is obvious that, unless otherwise stated, the various structural and functional features of each of the embodiments described above do not have to be considered to be combined and/or closely and/or inextricably linked with each other, but rather they should be considered to be simple juxtapositions. Furthermore, the structural and/or functional features of the various embodiments described above can be the subject, in whole or in part, of any different juxtaposition or of any different combination.

In particular, this description is provided by way of an illustrative example only. A person skilled in the art will be able to make numerous modifications thereto, in addition to the variants referred to throughout the above description, without departing from the scope of the invention. A system according to the invention can be applied to bulky machines or elements other than aeroplane engines, in particular to aircraft elements or vehicles in general, or even to any element, for example, on a construction site, etc.

The invention claimed is:

1. A movable carriage system for an aircraft element, said system comprising:
a first movable module and a second movable module that are adapted to be able to be controlled in a mutually coordinated manner, each movable module mainly extending along a longitudinal axis and comprising:
a frame equipped with at least three wheels;
a lifting device adapted to be able to move said aircraft element at least in a vertical direction; and
at least one link arm adapted to be able to secure together the frame of said first module and the frame of said second module;
wherein, each lifting device comprises at least one fork extending in a transverse direction, orthogonal to said longitudinal axis, and
wherein each lifting device is adapted to be able to move said aircraft element vertically and by an incline in relation to a lifting plane orthogonal to said vertical direction.

2. The system according to claim 1, wherein each movable module comprises a longitudinally extending rail, each fork being attached to a rail through a fixing device, each fork and each fixing device being mounted in translation along the rail.

3. The system according to claim 2, wherein each rail fixing device includes a stop rocker which is operated by means of a stop lever.

4. The system according to claim 1, wherein each fork includes at least one bearing pad.

5. The system according to claim 4, wherein each bearing pad comprises a system for adjusting the spatial orientation of the bearing pad along at least one axis.

6. The system according to claim 1, wherein each movable module comprises at least two jacks, named flexible jacks, with each flexible jack being associated with at least one ball bearing plate so as to allow at least one translation movement of said aircraft element in a horizontal plane, orthogonal to said vertical direction, in relation to each movable module.

7. The system according to claim 1, wherein each lifting device comprises at least one lifting jack.

8. The system according to claim 1, wherein at least the first movable module comprises:

a link cable configured to be connected to the second mobile module, and means for managing the storage and the deployment of the link cable.

9. The system according to claim 1, wherein, said at least one link arm comprises a communication cable adapted to allow data to be transferred between the first movable module and the second movable module, and each link arm extends in a transverse direction, orthogonal to said longitudinal direction of said movable module.

10. The system according to claim 1, wherein each link arm is linked to at least one from among said first movable module and said second movable module by a pivot link.

11. The system according to claim 1, wherein, said system comprises two link arms, with a first link arm being fixed to the frame of said first movable module and a second link arm being fixed to the frame of said second movable module.

12. The system according to claim 1, wherein the frame of each movable module is equipped with at least two motorized wheels.

13. A method for implementing a system according to claim 1, said movable carriage system having a first movable module and a second movable module, each movable module mainly extending along a longitudinal axis and comprising a frame equipped with at least three wheels, said method comprising the steps of:

said first movable module is controlled so as to insert at least one fork of said first movable module into sleeves of a transport jig, said transport jig being adapted to be able to receive said aircraft element; then said second movable module is controlled so as to insert at least one fork of said second movable module into the sleeves of said transport jig, the frame of said first module and the frame of said second movable module are secured together using at least one link arm; then said first movable module and said second movable module are controlled in a mutually coordinated manner;

said aircraft element is moved at least in a vertical direction using the device for lifting each movable module.

14. The method according to claim 13, wherein, after having moved said aircraft element at least in a vertical direction using said lifting device, flexible jacks of a lifting device of each movable module are deployed.

* * * * *